United States Patent
Bengtsson et al.

(10) Patent No.: US 11,884,147 B2
(45) Date of Patent: Jan. 30, 2024

(54) CIRCUMFERENTIAL LOCKING MECHANISM AND BATTERY LOCKING DEVICE COMPRISING SAME, POWER BATTERY PACK, AND VEHICLE

(71) Applicant: NIO CO., LTD., Shanghai (CN)

(72) Inventors: Jan Bengtsson, Shanghai (CN); Nan Li, Shanghai (CN); Xiaotao Tian, Shanghai (CN); Xikun Ding, Shanghai (CN); Chunping Yuan, Shanghai (CN)

(73) Assignee: NIO CO., LTD., Shanghai (CN)

( * ) Notice: Subject to any disclaimer, the term of this patent is extended or adjusted under 35 U.S.C. 154(b) by 1169 days.

(21) Appl. No.: 16/474,688

(22) PCT Filed: Dec. 21, 2017

(86) PCT No.: PCT/CN2017/117709
§ 371 (c)(1),
(2) Date: Jun. 28, 2019

(87) PCT Pub. No.: WO2018/121399
PCT Pub. Date: Jul. 5, 2018

(65) Prior Publication Data
US 2020/0124081 A1    Apr. 23, 2020

(30) Foreign Application Priority Data
Dec. 29, 2016    (CN) .......................... 201611242694.5

(51) Int. Cl.
*B60K 1/04*    (2019.01)
*F16B 39/10*    (2006.01)
*H01M 50/264*    (2021.01)

(52) U.S. Cl.
CPC ................ *B60K 1/04* (2013.01); *F16B 39/10* (2013.01); *H01M 50/264* (2021.01); *H01M 2220/20* (2013.01)

(58) Field of Classification Search
None
See application file for complete search history.

(56) References Cited

U.S. PATENT DOCUMENTS

2013/0156533 A1    6/2013    Yu et al.
2020/0094666 A1 *  3/2020    Bengtsson .............. F16B 19/02

FOREIGN PATENT DOCUMENTS

CN    1914065    2/2007
CN    202811890    3/2013
(Continued)

OTHER PUBLICATIONS

Machine translation of CN 206579465 U (Year: 2017).*
(Continued)

*Primary Examiner* — Robert S Carrico
(74) *Attorney, Agent, or Firm* — Sheridan Ross P.C.

(57) ABSTRACT

Provided are a circumferential locking mechanism, a battery securing device comprising same, a traction battery, and a vehicle. The circumferential locking mechanism comprises: a first component comprising an inner ring gear (10), the inner ring gear (10) having inner straight teeth (11) distributed along an inner circumference; a second component comprising an outer ring gear (20) and a tightening sleeve (30), the outer ring gear (20) having outer straight teeth (21) distributed along an outer circumference, the tightening sleeve (30) being fixed inside the outer ring gear (20) in an embedded manner, wherein the inner straight teeth (11) are adapted to engage with the outer straight teeth (21).

11 Claims, 2 Drawing Sheets

(56) References Cited

FOREIGN PATENT DOCUMENTS

| | | |
|---|---:|---:|
| CN | 103182961 | 7/2013 |
| CN | 104118340 | 10/2014 |
| CN | 203920481 | 11/2014 |
| CN | 203920482 | 11/2014 |
| CN | 105159393 | 12/2015 |
| CN | 105946812 | 9/2016 |
| CN | 106058109 | 10/2016 |
| CN | 106080159 | 11/2016 |
| CN | 206579465 | 10/2017 |
| DE | 102012104101 | 11/2013 |
| EP | 2423519 | 2/2012 |
| JP | 2003-133046 | 5/2003 |
| TW | 201506264 | 2/2015 |

OTHER PUBLICATIONS

Official Action for Taiwan Patent Application No. 10921245740, dated Dec. 23, 2020, 5 pages.
International Search Report for International (PCT) Patent Application No. PCT/CN2017/117709, dated Mar. 5, 2018, 3 pages.
Extended Search Report for European Patent Application No. 17885664.7, dated Jul. 29, 2020, 8 pages.
Official Action for European Patent Application No. 17885664.7, dated Aug. 13, 2021, 4 pages.
Official Action with Machine Translation for China Patent Application No. 201611242694.5, dated Mar. 1, 2023, 8 pages.

\* cited by examiner

CIRCUMFERENTIAL LOCKING MECHANISM AND BATTERY LOCKING DEVICE COMPRISING SAME, POWER BATTERY PACK, AND VEHICLE

CROSS REFERENCE TO RELATED APPLICATIONS

This application is a national stage application under 35 U.S.C. 371 and claims the benefit of PCT Application No. PCT/CN2017/117709, having an international filing date of 21 Dec. 2017, which designated the United States, which PCT application claimed the benefit of China Patent Application No. 201611242694.5 filed 29 Dec. 2016, the disclosure of each of which are incorporated herein by reference.

TECHNICAL FIELD

The invention relates to the technical field of circumferential anti-loosening and locking of components, and particularly to a circumferential locking mechanism.

Further, the invention further relates to a battery securing device comprising the circumferential locking mechanism, a traction battery pack, and a vehicle.

BACKGROUND ART

There are often situations in the prior art where relative rotation between two components needs to be restricted.

For example, how to ensure a constant pre-tightening force in a threaded connection is a difficult problem in the industry. Currently, common anti-loosening structures include a multi-tooth anti-loosening structure, or a pin-groove structure, etc. that is provided on a movable threaded member. This structure can only provide limited locking and positioning. With these techniques, when a threading torque reaches a predetermined value, if teeth or grooves cannot be engaged at a corresponding angle, the threaded member is still susceptible to loosening, and constant threading torque cannot be kept. For example, at present, for a multi-teeth or pin-groove bolt anti-loosening structure for guaranteeing a constant torque, the number of engaged teeth or grooves cannot be sufficiently great due to the limitation of the structural size, so that the bolt torque cannot be sufficiently maintained to be approximately constant.

In a battery securing device of a new energy vehicle, a central pull rod of the battery securing device needs to be circumferentially positioned or locked to rapidly mount or remove a traction battery pack. For example, Chinese Patent Publication No. CN 203543623 U discloses a battery securing device in which pins 500 on an adjustment member (integrally formed with the central pull rod) and grooves 205 on a limiting member are used to implement circumferential graduated locking and positioning. In this application, there is also a situation where engagement positions of pins 301 and grooves 101 may be inconsistent with engagement positions of the pins 500 and the grooves 205. To avoid such a situation, the pins 301 and the grooves 101 are replaced with a threaded connection in the prior art. However, there is still a disadvantage that the approximately constant threading torque cannot be kept.

SUMMARY OF THE INVENTION

It is an object of the invention to provide a circumferential locking mechanism, which can increase the number of anti-loosening engagement teeth under conditions where the dimensions and the space are limited, to achieve approximately continuous locking.

Further, objects of the invention are further to provide a battery securing device comprising the circumferential locking mechanism, a traction battery pack, and a vehicle.

To achieve the foregoing objects, a first aspect of the invention provides a circumferential locking mechanism, comprising:

a first component comprising an inner ring gear, the inner ring gear having inner straight teeth distributed along an inner circumference;

a second component comprising an outer ring gear and a tightening sleeve, the outer ring gear having outer straight teeth distributed along an outer circumference, the tightening sleeve being fixed inside the outer ring gear in an embedded manner, wherein the inner straight teeth are adapted to engage with the outer straight teeth.

Optionally, in the circumferential locking mechanism as described above, the inner ring gear and the outer ring gear are made of engineering plastic, and the tightening sleeve is made of metal.

Optionally, in the circumferential locking mechanism as described above, the outer ring gear and the tightening sleeve are of an integrally overmolded structure.

Optionally, in the circumferential locking mechanism as described above, an inner flange is formed on an inner circumferential surface of the inner ring gear, and the inner flange is located at one end of the inner straight teeth; and an outer flange is formed on an outer circumferential surface of the outer ring gear, the outer straight teeth are located at an outer circumference of the outer flange, one end of the tightening sleeve extends out of the outer ring gear, and the outer diameter of the end is smaller than the inner diameter of the inner flange.

Optionally, in the circumferential locking mechanism as described above, C-shaped notches are circumferentially distributed at one end of the inner ring gear that is away from the inner straight teeth.

Optionally, in the circumferential locking mechanism as described above, the other end of the tightening sleeve is provided with an outer flange, and the outer flange of the outer ring gear is overmolded onto the outer flange of the tightening sleeve.

Optionally, in the circumferential locking mechanism as described above, an end face of the other end of the tightening sleeve is recessed inwardly with respect to or flush with a corresponding end face of the outer ring gear.

Optionally, in the circumferential locking mechanism as described above, vertical grooves are distributed on each of the inner circumference and the outer circumference of the tightening sleeve, and the outer ring gear is at least partially embedded at the vertical groove on the outer circumference of the tightening sleeve.

To achieve the foregoing objects, a second aspect of the invention provides a battery securing device, comprising the circumferential locking mechanism according to any one of the first aspect.

Optionally, in the battery securing device as described above, the first component is an adjustment member of the battery securing device, and the adjustment member is circumferentially fixed relative to a central pull rod of the battery securing device but is axially movable along the central pull rod; and the second component is a limiting member of the battery securing device.

To achieve the foregoing objects, a third aspect of the invention provides a traction battery pack for a vehicle, the traction battery pack comprising the battery securing device according to any one of the second aspect.

Optionally, in the traction battery pack as described above, the battery securing device is fixed to the traction battery pack via the second component.

To achieve the foregoing objects, a fourth aspect of the invention provides a vehicle, comprising the battery securing device according to any one of the second aspect.

Optionally, in the vehicle as described above, a traction battery pack of the vehicle is secured to the vehicle via the battery securing device.

BRIEF DESCRIPTION OF THE DRAWINGS

The disclosure of the invention will be more apparent with reference to the accompanying drawings. It should be appreciated that these accompanying drawings are merely used for the purpose of description, and are not intended to limit the scope of protection of the invention. In the figures.

DETAILED DESCRIPTION OF EMBODIMENTS

Figure 1:
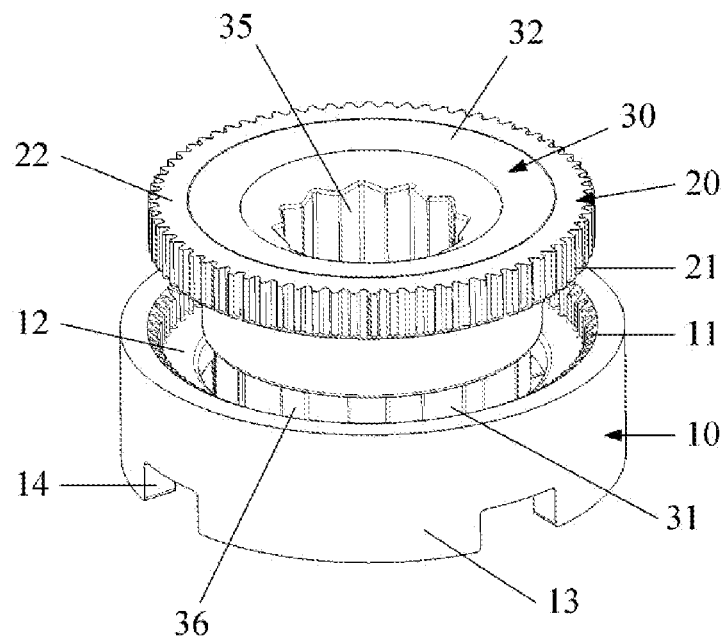
FIG. 1 is a schematic perspective diagram of an embodiment of a circumferential locking mechanism according to the invention.

Specific embodiments of the invention are described below in detail with reference to the accompanying drawings. In the accompanying drawings, the same reference numerals represent the same or corresponding technical features.

FIG. 1 is a schematic perspective diagram of an embodiment of a circumferential locking mechanism according to the invention.

The circumferential locking mechanism of the illustrated embodiment comprises a first component and a second component. In the illustration, the first component comprises an inner ring gear 10, and the second component comprises an outer ring gear 20 and a tightening sleeve 30, wherein the tightening sleeve 30 is fixed inside the outer ring gear 20 in an embedded manner. The circumferential locking of the first component and the second component can be achieved by engaging the inner ring gear 10 with the outer ring gear 20. The embedded outer ring gear 20 and tightening sleeve 30 may be implemented by integral molding or by separately manufacturing same and then embedding same together, have a simple machining process and are easy to assemble.

It will be appreciated that in an alternative embodiment, in order to achieve the function expansion, the first component and the second component may further comprise other components or structures attached to the above inner ring gear 10 and the outer ring gear 20 and/or the tightening sleeve 30 without departing from the basic principles of the invention.

As can be seen from FIG. 1, in this embodiment, the ring gear 10 may be annular with inner straight teeth 11 distributed along the inner circumference. An inner flange 12 is further formed on the inner circumferential surface of the ring gear 10, and the inner flange 12 is located at one end of the inner straight teeth 11. In this example, the inner flange 12 is located at the axially middle portion of the inner circumferential surface of the inner ring gear 10, and C-shaped notches 14 may be circumferentially distributed at one end 13 of the inner ring gear 10 that is away from the inner straight teeth 11. It will be appreciated that external threads may be formed on the outer circumferential surface of the ring gear 10, and when the inner ring gear is assembled to another component by means of the external threads, the inner ring gear 10 can be tightened to the another component by engaging a tool with the C-shaped notches 14.

As also can be seen from FIG. 1, in this embodiment the outer ring gear 20 has outer straight teeth 21 distributed along the outer circumference, and the outer straight teeth 21 are adapted to form-fit with the inner straight teeth 11. Specifically, according to the illustrated example, an outer flange 22 may be formed on the outer circumferential surface of the outer ring gear 20, and the outer straight teeth 21 are located on the outer circumference of the outer flange 22. One end 31 of the tightening sleeve 30 extends out of the outer ring gear 20, and it can be seen that the outer diameter of the end 31 is smaller than the inner diameter of the inner flange 12. An end face 34 of the other end 32 of the tightening sleeve 30 is recessed inwardly with respect to or flush with a corresponding end face 23 of the outer ring gear 20. Vertical grooves 35, 36 are respectively distributed on the inner circumference and the outer circumference of the tightening sleeve 30, and the outer ring gear 20 is at least partially embedded at the vertical groove 36 on the outer circumference of the tightening sleeve 30.

In a preferred embodiment, the ring gear 10 and the outer ring gear 20 may be made of engineering plastic, and the tightening sleeve 30 may be made of metal. It will be appreciated that for the inner ring gear and the outer ring gear made of engineering plastic, the inner straight teeth 11 and the outer straight teeth 21 will be easier to machine, and it is possible to machine as many teeth as possible to achieve an approximately continuous locking. More preferably, in order to ensure a firm and reliable connection between the outer ring gear 20 and the tightening sleeve 30, the outer ring gear 20 and the tightening sleeve 30 may be of an integrally overmolded structure, and the tightening sleeve 30 is pre-embedded inside the outer ring gear 20.

Figure 2:
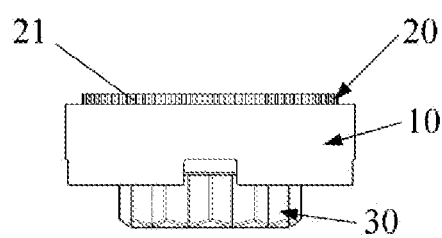
FIGS. 2 and 3 are a side view and a cross-sectional view, respectively, of the circumferential locking mechanism of FIG. 1 with inner and outer ring gears being engaged.
Figure 3:
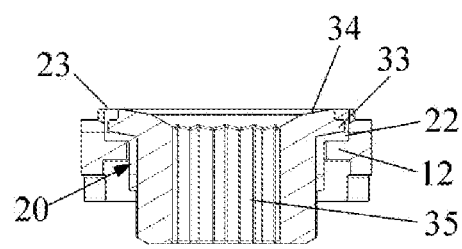
Figure 4:
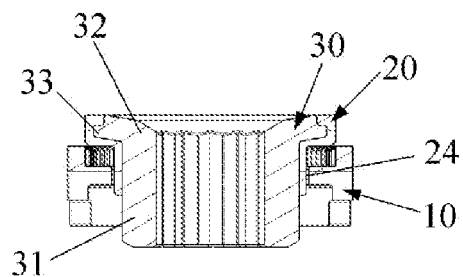
FIG. 4 is a cross-sectional view of the circumferential locking mechanism of FIG. 1 with the inner and outer ring gears being disengaged.

FIGS. 2 and 3 are a side view and a cross-sectional view, respectively, of the circumferential locking mechanism of FIG. 1 with the inner and outer ring gears being engaged, and the two being in an engaged and anti-loosening state. FIG. 4 is a cross-sectional view of the circumferential locking mechanism of FIG. 1 with the inner and outer ring gears being disengaged, and the assembly of the outer ring gear and the tightening sleeve being jacked up.

According to FIG. 2, when the inner and outer ring gears are engaged, one end 31 of the tightening sleeve 30 that is away from the outer straight teeth 21 passes through the inner flange 12 of the inner ring gear 10 and extends out of the inner ring gear 10. As can be seen in conjunction with FIG. 3, the outer straight teeth 21 of the outer ring gear 20 engage with the inner straight teeth 11 of the inner ring gear 10, and the outer flange 22 of the outer ring gear 20 can abut against the inner flange 12 of the ring gear 10 to axially hold the outer ring gear 20 and the inner ring gear 10 in position relative to each other. The end 31 of the tightening sleeve 30 extends through the inner flange 12 in the inner ring gear 10. Since both the inner ring gear 10 and the outer ring gear 20 of the invention are made of engineering plastic, both the inner straight teeth 11 and the outer straight teeth 21 have the advantage of being easy to machine, as shown, a larger number of inner straight teeth and outer straight teeth can be machined. In this case, the inner straight teeth 11 and the outer straight teeth 21 can be engaged substantially at each circumferential position, thereby achieving an approximately continuous locking of the inner ring gear and the outer ring gear.

In FIG. 4, the assembly of the outer ring gear 20 and the tightening sleeve 30 is pushed upward relative to the inner ring gear 10 such that the inner and outer straight teeth of the inner and outer ring gears have been completely disengaged, at this time, the assembly of the outer ring gear 20 and the tightening sleeve 30 can rotate relative to the ring gear 10. It can be seen that by means of this operation, the circumferential locking structure of the invention can realize quick locking and unlocking, which is very simple and quick.

Figure 5:
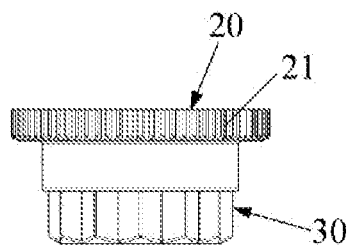
FIG. 5 is a side view of the assembly of the outer ring gear and a tightening sleeve of the circumferential locking mechanism of FIG. 1.

FIG. 5 is a side view of the assembly of the outer ring gear and a tightening sleeve of the circumferential locking mechanism of FIG. 1, showing the outer ring gear 20 and the tightening sleeve 30 embedded together. As can be seen in connection with FIGS. 4 and 5, the outer ring gear 20 is securely embedded at one end 32 of the tightening sleeve 30, preferably they are integrally overmolded. An outer flange 33 is provided at the one end 32 of the tightening sleeve 30, the outer flange 22 of the outer ring gear 20 is overmolded onto the outer flange 33 of the tightening sleeve 30, and the overmolded outer flanges 22, 33 define the axial movement between the outer ring gear 20 and the tightening sleeve 30. Additionally, one end 24 of the outer ring gear 20 is overmolded onto a portion of the outside vertical groove 36 of the end 31 of the tightening sleeve 30, thereby defining the circumferential rotation between the outer ring gear 20 and the tightening sleeve 30.

It can be understood by those skilled in the art that in other embodiments, the outer ring gear 20 and the tightening sleeve 30 having the corresponding structures such as the outer flanges 22, 33 and the vertical grooves 35, 36 may be separately machined, the outer ring gear 20 is then sleeved onto the tightening sleeve 30, and they are snap-fitted together at the outer flange 22 of the outer ring gear 20 and the outer flange 33 of the tightening sleeve 30 to achieve a secure embedment between the two. It will be appreciated that in order to facilitate the snap-fit assembly of the two, at least the design at the outer flange 22 of the outer ring gear 20 or the outer flange 33 of the tightening sleeve 30 is preferably somewhat resilient.

The tightening sleeve 30 may be made of metal material. Those skilled in the art will appreciate that the metal material has higher stiffness, greater endurance, and more reliable engagement with other attachment components than the engineering plastic.

As will be appreciated from the above description, the circumferential locking mechanism of the invention incorporates the advantages of easy machining of the engineering plastic and large endurance of metal, and at the same time, has a simple structure, has a good anti-loosing effect, and can maintain an approximately constant bolt torque.

Figure 6:
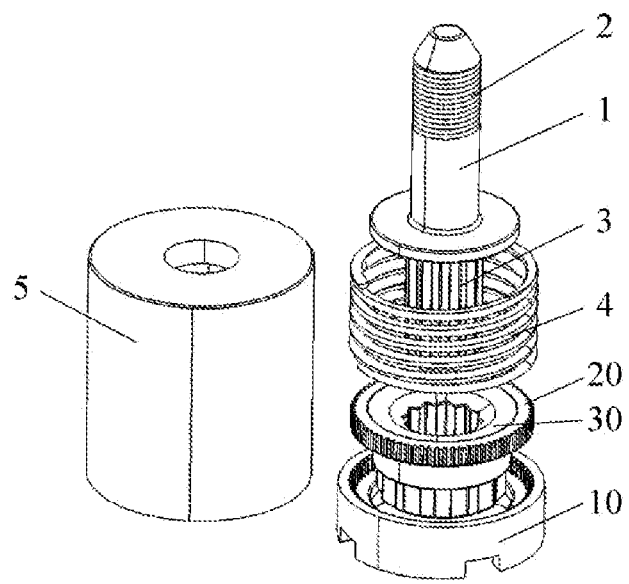
FIG. 6 is a schematic exploded diagram of an embodiment of a battery securing device according to the invention.

FIG. 6 is a schematic exploded diagram of an embodiment of a battery securing device according to the invention. As can be seen from the figure, such a battery securing device comprises a central pull rod, a locking housing 5, and a circumferential locking mechanism of the embodiment shown in FIGS. 1-4. In FIG. 6, the central pull rod of the battery securing device comprises a retaining portion 1, a threaded portion 2, and a spline portion 3, and a spring 4 is sleeved over the spline portion 3. The spline at the spline portion 3 is adapted to engage with the vertical groove in the tightening sleeve 30. After assembly, the spline portion 3, the spring 4, and the assembly of the outer ring gear and the tightening sleeve are all accommodated inside the locking housing 5.

During use, for example, when the battery securing device is used to secure a traction battery on a vehicle, the pull rod passes through a mounting frame (not shown) at a battery pack and a mounting frame (not shown) at a vehicle body in sequence, the inner ring gear 10 as a limiting member may be fixed to the mounting frame of the battery pack, and the threaded portion 2 of the pull rod is in threaded connection with a support plate on the mounting frame at the vehicle body, so that the mounting frame at the battery pack and the mounting frame at the vehicle body are held at the retaining portion 1 to fix the battery pack on the vehicle body. It is conceivable that a plurality of battery securing devices shown in the figure are typically used on the vehicle to stably fix the battery pack.

In order to achieve quick disassembly and assembly of the battery pack, the circumferential locking mechanism of FIGS. 1 to 4 is applied to the battery securing device. The assembly of the outer ring gear 20 and the tightening sleeve 30 of the circumferential locking mechanism serves as an adjustment member of the battery securing device whereas the inner ring gear 10 serves as a limiting member of the battery securing device, and the elastic force of the spring 4 forces the outer ring gear engages with the ring gear of the assembly. The outer circumferential surface of the inner ring gear 10 may be designed to have external threads (or other connection features), and by means of threaded connection, the outer ring gear 10 can be engaged to the mounting frame of the battery pack. The vertical groove at the center of the tightening sleeve 30 is adapted to engage with the spline portion 3 such that the assembly of the tightening sleeve 30 and the outer ring gear 20 is circumferentially fixed relative to the central pull rod but is axially movable along the spline portion of the central pull rod.

It can be seen that, according to the battery securing device in the figure, when unlocking, the assembly of the outer ring gear 20 and the tightening sleeve 30 is pushed upward (i.e., jacked up) by a special purpose tool to disengage the assembly from the inner ring gear 10, and the assembly is then rotated to unscrew the threaded portion 2 from the mounting frame of the vehicle body, that is, the unlocking is completed. During locking, the special purpose tool is used to push upward, that is, jack up the assembly to disengage same from the inner ring gear 10, the assembly is then rotated to tighten the threaded connection between the threaded portion 2 and the mounting frame of the vehicle body to achieve a specified torque of the bolt, and after the special purpose tool is removed, the spring 4 will push the assembly such that the outer straight teeth of the outer ring gear 20 thereof engage with the inner straight teeth of the inner ring gear 10, and the outer flange 22 of the outer ring gear 20 abuts against the inner flange 12 of the inner ring gear 10 to lock the axial movement and the circumferential rotation of the assembly relative to the central pull rod to accomplish the locking and anti-loosing function. It can be seen that the solution is simple to machine, has a good anti-loosing effect, and is simple and quick to operate.

In the foregoing locking operations, when the special purpose tool is used to tightly screw the threaded portion 2 on the central pull rod to the mounting frame at the vehicle body, the threading torque is typically used as a control indicator. That is, when the threading torque reaches the target value, the screwing is stopped and the special purpose tool is withdrawn. The inner ring gear and the outer ring gear are locked by the battery securing device of the invention, and since the number of engaging teeth of the two is great, much more locking positions are provided than in the prior art, so that the threading torque is kept constant at almost any circumferential position.

According to the foregoing description, those skilled in the art may conceive a traction battery pack and a vehicle which comprise the circumferential locking mechanism or the battery securing device. For example, in order to facilitate the mounting of the traction battery pack to the vehicle, the battery securing device may be fixed to the traction battery pack via the inner ring gear. In addition, in such a vehicle, the traction battery pack may be locked to the vehicle body of the vehicle via the battery securing device.

The technical scope of the invention is not merely limited to the above description. Those skilled in the art can make various changes and modifications to the above embodiments without departing from the technical idea of the invention, and these changes and modifications shall fall within the scope of the invention.

What is claimed is:

1. A battery securing device, comprising:
   a central pull rod;
   a first component comprising an inner ring gear;
   a second component disposed around the central pull rod, the second component comprising an outer ring gear and a tightening sleeve, the tightening sleeve being fixed inside the outer ring gear, the tightening sleeve being provided with a vertical groove;
   wherein the central pull rod is provided with a spline portion to match with the vertical groove, and a spring is sleeved over the central pull rod;
   wherein a motion of the central pull rod relative to the assembly of the outer ring gear and the tightening sleeve is locked by the vertical groove matching with the spline portion in the inner ring gear engaging with the outer ring gear forced by the spring; and
   wherein the motion of the central pull rod relative to the assembly of the outer ring gear and the tightening sleeve is unlocked with outer ring gear separating from the inner ring gear.

2. The battery securing device according to claim 1, wherein the inner ring gear engages with the outer ring gear by an inner teeth distributed along an inner circumference of the inner ring gear engaging with an outer teeth distributed along an outer circumference of the outer ring gear.

3. The battery securing device according to claim 2, an inner flange is formed on an inner circumferential surface of the inner ring gear, and the inner flange is located at one end of the inner teeth; and
   an outer flange is formed on an outer circumferential surface of the outer ring gear, the outer teeth are located at an outer circumference of the outer flange, one end of the tightening sleeve extends out of the outer ring gear, and the outer diameter of the end is smaller than the inner diameter of the inner flange.

4. The battery securing device according to claim 3, wherein the other end of the tightening sleeve is provided with an outer flange, and the outer flange of the outer ring gear is overmolded onto the outer flange of the tightening sleeve.

5. A battery pack including the battery securing device according to claim 4.

6. The battery securing device according to claim 3, wherein an end face of the other end of the tightening sleeve is recessed inwardly with respect to or flush with a corresponding end face of the outer ring gear.

7. A battery pack including the battery securing device according to claim 3.

8. A battery pack including the battery securing device according to claim 2.

9. The battery securing device according to claim 1, wherein C-shaped notches are circumferentially distributed at one end of the inner ring gear that is away from the inner teeth.

10. A battery pack including the battery securing device according to claim 9.

11. A battery pack including the battery securing device according to claim 1.

* * * * *